United States Patent [19]

Riebling

[11] 3,765,853

[45] Oct. 16, 1973

[54] PROCESS FOR MAKING METAL SPHERES IN OXIDE GLASSES

[75] Inventor: Eugene F. Riebling, Copley, Ohio

[73] Assignee: The University of Akron, Akron, Ohio

[22] Filed: July 31, 1972

[21] Appl. No.: 276,821

[52] U.S. Cl............................ 65/18, 65/31, 61/32, 65/134
[51] Int. Cl............................................. C03c 27/04
[58] Field of Search ..................... 65/18, 20, 21, 32, 65/134, 31

[56] References Cited
UNITED STATES PATENTS

| | | | |
|---|---|---|---|
| 3,345,190 | 10/1967 | Albinak et al. | 65/32 X |
| 3,508,892 | 4/1970 | Torok | 65/32 X |
| 3,518,209 | 6/1970 | Provance | 65/134 X |
| 3,607,169 | 9/1971 | Coxe | 65/21 |
| 3,704,110 | 11/1972 | Finn et al. | 65/32 |

*Primary Examiner*—Robert L. Lindsay, Jr.
*Attorney*—Hamilton, Renner & Kenner

[57] ABSTRACT

A process for making small metal spheres encapsulated in an oxide glass. A metal compound, which decomposes to the elemental metal upon heating is mixed with oxide glass particles such that the final material contains from about 1 to about 15 percent of the metal by weight. The mixture is then heated to a temperature above the decomposition temperature of the metal compound as well as above the melting temperature of the metal wherein the oxide glass has a viscosity range of from 1 to about 5,000 poise. The mixture is then cooled to a temperature below the freezing point of the metal.

10 Claims, No Drawings

PROCESS FOR MAKING METAL SPHERES IN OXIDE GLASSES

BACKGROUND OF THE INVENTION

The present invention relates generally to metal spheres encapsulated in oxide glasses. More specifically, the present invention relates generally to various types of metal spheres having a diameter of approximately 0.1 to about 500 microns encapsulated in oxide glasses.

Small metal spheres, ranging in diameter from one to one thousand microns (1–1,000 μm) may be embedded in transparent plastics to enhance reflectivity. Small metal spheres have also been used in other light reflective devices. Additionally, they have been embedded in glasses and other matrices for mechanical and electrical purposes.

Preparation of these spheres has been accomplished by the helium plasma torch procedure which yields spheres having a diameter of up to 1,000 μm, or by the use of graphite crucibles in vacuo for spheres having a diameter ranging from 50 to 500 μm. Colloidal size spheres having a diameter of less than 1 μm, have been prepared by condensation in free space and the pyrolysis of metal salts in flames yielding particles of less than 0.1 μm and approximately 0.03 μm in diameter, respectively.

Colloidal dispersions of non-spherical metal particles in oxide glasses are generally achieved by dispersing relatively small amounts of the metal throughout the glass mixture. Dispersal is usually accomplished by mixing the metal salt with the glass batch or by adding an aqueous salt solution so that a random distribution is obtained. The latter method is employed where an extremely low percentage of the metal is to be uniformly distributed throughout a large quantity of glass. One way to achieve a colloidal dispersion is that the mixture is heated and upon cooling the glass must solidify before the metal freezes. Reducing gas mixtures, which control the oxygen potential, have been used to obtain grey dispersions of from 0.05 to 0.25 weight per cent of silver. Moreover, applied voltages have been used to form colloidal silver alloys that can color a glass.

The striking or sudden appearance of colloidal metal in a glass can occur either on cooling from the molten state, or during careful reheating. The latter may occur at lower temperatures because the precipitation (removal of metal from a supersaturated solution in glass) of the colloidally dispersed metal can accelerate the conversion of oxidized to reduced metal. The colloidally dispersed metal crystals thus produced can possess well developed faces.

Colloidal dispersions are formed when the weight per cent of the metal is low, that is, below 1.0 percent weight such as 0.1 weight per cent, while the presence of an increased weight per cent of the metal above 1.0 percent forms non-spherical agglomerates which have partial diameters generally in excess of 1 millimeter.

SUMMARY OF THE INVENTION

It is, therefore, a primary object of the present invention to make small metal spheres ranging in diameter from about 0.1 micron to about 500 microns.

It is another object of the present invention to make small metal spheres, as above, where high metal concentrations on the order of one or more weight per cent are utilized without the formation of agglomerations.

It is yet another object of the present invention to form small metal spheres, as above, encapsulated in minute bubbles within the oxide glass.

These and other objects, together with the advantages thereof over existing and prior art methods, are accomplished by means hereinafter described and claimed.

In general, a process for the manufacture of small metal spheres in oxide glasses is accomplished by the following steps. A decomposable metal compound which upon heating decomposes to the elemental metal is mixed with an amount of oxide glass particles such that the final glass material contains from about 1 to about 15 percent of metal by weight based on a metal having a 10.5 gram/cc density. The mixture is then heated to a temperature above the metal compound decomposition temperature and above the metal melting temperature wherein the glass mixture has a viscosity range of from 1 to about 5,000 poise. The mixture is then cooled to room temperature to encapsulate the metal spheres in bubbles. Alternatively, the mixture is cooled to a temperature below the freezing point of the metal and then slowly reduced to room temperature whereby the encapsulating bubbles shrink and disappear.

DESCRIPTION OF THE PREFERRED EMBODIMENTS

In general, small metal spheres ranging from about 0.1 to about 500 microns encapsulated or embedded in conventional oxide glasses can be used in a variety of light reflective devices such as runway markers. Additionally, such materials may be employed as dielectrics or for electrical purposes.

Briefly, according to the concept of the present invention, various decomposable metal compounds are added to any conventional oxide glass, heated to a temperature above the metal compound decomposition temperature as well as the melting temperature of the metal and then cooled. Since most conventional oxide glasses can exist in a honey-like viscosity state at temperatures below 1,850° C, only metals which melt and compounds or oxides of such metals which decompose below such a temperature can be used. Otherwise, practically all of the metal may remain in the compound form and become an integral part of the glass structure at the atomic level. The decomposable metal compounds are usually metal oxides, metal nitrates, metal sulfates, metal salts or metal halides. Generally, these compounds with the exception of the metal oxides have been found to partially decompose upon heating by changing to the metal oxide form or if the metal compound does not contain oxygen, by reacting with the atmosphere to shed its non-metal constituent and to form a metal oxide. Hence, often these compounds are simply referred to as metal oxides. Upon further or continued heating, the metal oxide if formed, decomposes to leave a metal which depending upon the particular metal used may be in the solid or liquid state. If solid, the glass, of course, requires further heating to melt the metal.

Particular metal compounds which decompose at temperatures below 1,850° C include silver compounds such as $Ag_2O$ and $AgNO_3$; gold compounds such as $HAuCl_4 \cdot 3H_2O$ and $Au_2O_3$; copper compounds such as CuO, $Cu_2O$, $Cu(NO_3)_2 \cdot 3H_2O$ and $CuCO_3$; tin compounds such as SnO, $SnO_2$, and $Sn(NO_3)_4$ and $SnSO_4$; cobalt compounds such as $Co_2O_3$ and $CoSO_4$ as well as cadmium compounds such as CdO and $CdCO_3$. The exact decomposition temperatures of these compounds are readily available in any handbook. In general, any metal compound which decomposes to its elemental metal at a temperature below the temperature required to give the oxide glass a specific viscosity range, set forth below, can be used. As previously noted, the maximum temperature to which conventional oxide glasses can be heated thereby lowering the glass viscosity is approximately 1,850° C due primarily to practical requirements such as heating volatilization and container corrosion.

The production of small metal substantially spherical objects encapsulated in oxide glasses requires a relatively high concentration of a metal compound which is mixed or distributed in preferably finely divided or ground glass. The amount of metal compound used is such that the amount of metal spheres of 0.1 to 500 microns in the final glass material is from about 1 to about 15 percent based on a metal, such as silver, having a density of 10.5 grams/cc. Thus, a light metal such as cobalt with a density of 8.62 would have a range of about 0.82 to about 8.2 percent by weight. In terms of actual amount of the metal added to the oxide glass, the weight range of the metal in the metal compound to the total weight of the mixture is roughly from 1 to about 22 percent where the metal has a density of 10.5 grams/cc. Such amounts of metal is considerably more metal or its equivalent than is normally used to develop colloidal metal dispersions in oxide glasses. Generally, amounts below the upper limit are preferred since they do not tend to form nearly as many agglomerations as high amounts.

Considering the distribution or mixing procedure of the metal compound in the glass particles or glass batch, preferably it should be such so as to produce a distribution of the metal that is incomplete or less than that to obtain random distribution although a complete distribution can be used. Thus, such distribution is not as efficient or complete as the procedures used to obtain colloidal dispersions of metals in oxide glasses. Hence, usually a crude mechanical mixing process may be used. If a metal compound which has a low melting in temperature is used, for example $AgNO_3$ which melts at 212° C, the metal may be blended for an even shorter period of time. Any of the above mixing procedures is usually sufficient to distribute the metal compound and help in the formation of local concentrations that are high enough to produce small metal spheres of about 0.1 to about 500 microns in diameter. Although some of the smaller metal spheres, that is from about 0.1 to about 1.0 microns, are similar in size to colloids, they are spherical and thus unlike colloids which have irregular surfaces.

After the metal compound is incompletely distributed, it is heated along with any conventional additives to a temperature above the decomposition temperature of the metal compound as well as above the melting point of the metal. Generally, the heating process is carried out in two steps if the metal melting point is above the decomposition temperature to favor formation of metal concentrations with the temperature being held above the decomposition temperature for a short period of time such as one-half hour. Of course, at such temperatures, some of the metal will volatilize. The temperature dependence of the viscosity of the conventional oxide glass must be such that it can control two important steps in the process. The glass transition region ($T_g = 10^{13.0}$ to $10^{14.5}$ poise) of the oxide glass must lie below the melting point of the metal. Otherwise, the glass would be rigid before the liquid metal droplets freeze to solid spheres. This would produce irregularly shaped metal particles instead of spheres. There are numerous oxide glass compositions that can satisfy this requirement for a given metal and such glasses are well known to one skilled in the art.

Also, the glass melt viscosity above the melting point of the metal controls metal droplet size and distribution. Thus, at the highest temperatures required to homogenize the reaction mixture above the melting point of the metal, the host glass melt must possess a viscosity generally within the range from about 5,000 poise to about one poise. Homogenization viscosities within that range have been found to produce the best distribution of spheres and the time required at the highest temperature is usually short, such as a half hour. Samples of mixtures held at final homogenization viscosities of more than about 5,000 poise, prior to quenching such as in air, has been found to produce colloidal dispersions, stringlets, or stands of metal. Higher homogenization viscosities thus severely impede the metal agglomeration required to form a sphere in the 0.1 to 500 micron range of size. In contrast, sample mixtures held for longer times at homogenization viscosities of somewhat less than ten poise, prior to quenching, produce a relatively small number of larger spheres that tend to collect on the bottom of the container. Shorter hold times at these lower viscosities tend to yield better distributions of smaller spheres. Thus, lower homogenization viscosities and/or longer times tend to favor undesirable gross liquid metal agglomeration. The rate of cooling from the final homogenization temperature, through the freezing point of the metal, to the glass transition region of the host glass, is critical to the formation of an encompassing bubble around each metal sphere. The bubbles form around each liquid metal droplet as it solidifies to a sphere. Generally, the ratio of the bubble diameter to the sphere diameter is from 1.1 to 1.65 with the larger bubbles being formed as the cooling rate is increased. The contraction that occurs during metal solidification produces a low pressure void around each sphere. The void can be instantaneously expanded against the yieldable glass by the release of the latent heat of fusion during the solidification of the metal. Rapid cooling below the melting point of the metal, but above the Tg of the host glass, can freeze-in the surrounding, enlarged bubble. The result is a composite that consists of a distribution of bubble encapsulated metal spheres within the oxide glass. In contrast, very slow cooling, or even a temperature hold, generally just below the melting point of the metal, but above the Tg of the host glass, for a length or brief period of time which is readily determined for the various oxide glasses and particular metals, can allow the bubble to collapse back around the now solid metal sphere. The result in this case is a composite that consists of a distribution of metal spheres embedded in the oxide glass.

If it is desired to obtain the metal spheres apart from the glass, any glass chemical solvent readily known to one skilled in the art such as various acids may be used to dissolve the glass. Such metal spheres may be used for many purposes such as by their application to various surfaces with a transparent adhesive so that they serve as reflectors.

The process by which small metal spheres can be encapsulated in oxide glasses will be more fully understood by referring to the following examples.

Table I records several metal compound/glass compositions, expressed in weight per cent, that are operable according to my invention.

Table I

| Example | Batch Per Cent | | | | | |
|---|---|---|---|---|---|---|
|  | 1 | 2 | 3 | 4 | 5 | 6 |
| $AgNO_3$ | 33 | 33 | 15 | — | — | — |
| $HAuCl_4.3H_2O$ | — | — | — | 16.5 | 15.8 | 12.6 |
| $SiO_2$ | — | — | 62 | 61 | — | — |
| $GeO_2$ | 67 | 67 | — | — | 84.2 | 66.7 |
| $Na_2O$ * | — | — | 15.8 | 15.5 | — | — |
| $K_2O$ ** | — | — | — | — | — | 20.7 |
| CaO | — | — | 7.2 | 7 | — | — |

* Added as $Na_2CO_3$
** Added as $K_2CO_3$

Batches of Example 1 were prepared by mixing finely divided dry batch materials totaling 10 gm. in alumina crucibles and held at 250° C for one hour. They were then placed in a resistance heated furnace and held in air at 1,270° C for one hour. The temperature was then dropped to 920° C (below the melting point of silver) and held there for three hours. Finally, the samples were cooled either rapidly or slowly to 25° C. The result was a distribution of silver spheres, free of encompassing bubbles, that were embedded in a silver germanate glass that contained about 15 mole percent $Ag_2O$ as an integral part of the host glass.

Batches of Example 2 were prepared by mixing finely divided dry batch materials totaling 15 gm. in alunina crucibles. They were then held at 275° C for two hours. They were then placed in a resistance heated furnace and held in air at 1,270° C for one-half hour. They were then rapidly cooled to 25° C. The result was a distribution of silver spheres, each with an encompassing bubble, embedded in a silver germanate glass that contained about 15 mol percent $Ag_2O$ as an integral part of the host glass.

Batches of Example 3 were prepared by mixing finely divided batch materials totaling 10 gm. in alunina crucibles. They were then held at 290° C for 2 hours. They were then placed in a resistance heated furnace and held at 1,370° C for one-half hour. They were then rapidly cooled to 25° C. The result was a distribution of silver spheres, each with an encompassing bubble, embedded in a soda-lime-silica glass.

Batches of Example 4 were prepared by mixing finely divided batch materials totaling 5 gm. in alunina crucibles. They were held at 125° C for 20 minutes. They were then placed in a resistance heated furnace and held at 1,350° C for 40 minutes. They were then rapidly cooled to 25° C. The result was a distribution of gold spheres, each with an encompassing bubble, embedded in a soda-lime-silica glass.

Batches of Example 5 were prepared by mixing finely divided batch materials totaling 5 gm. in alumina crucibles. They were then placed in a resistance heated furnace at 1,510° C for 25 minutes. They were then rapidly cooled at 25° C. The result was a distribution of gold spheres, each with an ecompassing bubble, embedded in a pure germania glass.

Batches of Example 6 were prepared by mixing finely divided batch materials totaling 5 gm. in alumina crucibles. They were then held at 125° C for 10 minutes. They were then placed in a resistance heated furnace at 1,220° C for 20 minutes. They were then rapidly cooled to 25° C. The result was a distribution of gold spheres, each with an encompassing bubble, embedded in a potassium germanate glass that contained about 25 mole percent $K_2O$.

The metal spheres so produced in the above examples may be subsequently separated from their host oxide glasses by the use of selective chemical solvents. For example, sodium hydroxide solutions will dissolve germania-rich glasses, but will not dissolve silver metal. Similarly, gold is insoluble in many acids that will dissolve silicate glasses.

As apparent to one skilled in the art, modifications can be made without departing from the spirit of the invention herein disclosed and claimed, the scope of the invention being limited solely by the scope of the attached claims.

I claim:

1. A process for making small metal spheres encapsulated in an oxide glass comprising the steps of, distributing metal compounds which decompose to the elemental metal upon heating throughout particles of oxide glass in such an amount that the final material contains from about 1 to about 15 percent of metal by weight based on a metal density of 10.5 grams/cc; heating said mixture to a temperature above the decomposition temperature of said metal compound and the melting temperature of said metal to form metal spheres within the glass wherein said oxide glass has a viscosity range of from 1 to about 5,000 poise; and, cooling said mixture to a temperature below the freezing point of said metal so that the size of the metal spheres in the final material is from about 0.1 to 500 microns.

2. A process for making small metal spheres, as set forth in claim 1, wherein said metal compound is incompletely distributed in the oxide glass.

3. A process for making small metal spheres, as set forth in claim 1, wherein said mixture is heated to said temperature above the decomposition temperature of said metal compound and maintained at said temperature before heating said mixture to said temperature above the melting point of said metal.

4. A process for making small metal spheres, as set forth in claim 1, wherein said metal is cooled to a temperature generally just below the freezing point of said metal snd held at such temperature for a brief period of time before final cooling.

5. A process for making small metal spheres, as set forth in claim 1, wherein said mixture is cooled at such a rate so that a bubble is formed in the glass around the metal spheres.

6. A process for making small metal spheres, as set forth in claim 5, wherein the ratio of the diameter of said bubble to the metal sphere is from about 1.1 to about 1.65.

7. A process for making small metal spheres, as set forth in claim 1, wherein after cooling the mixture, the glass is removed by selective chemical solvents.

8. A process for making small metal spheres, as set forth in claim 1, wherein said metal compound includes any metal compounds having a decomposition temperature below and a melting temperature below about 1,850° C.

9. A process for making small metal spheres, as set forth in claim 8, wherein said metal compound is selected from the group consisting of, metal carbonates, halides, nitrates, oxides, sulfate, and salts.

10. A process for making small metal spheres, as set forth in claim 9, wherein said metal compound is selected from the group comprising; $AgNO_3$, $HAuCl_4 \cdot 3H_2O$ and $Ag_2SO_4$.

* * * * *